United States Patent Office 3,299,187
Patented Jan. 17, 1967

3,299,187
PHOSPHORUS-CONTAINING POLYISOCYANATES
OF PENTAERYTHRITOL
Rudi F. W. Rätz, Hamden, Conn., assignor to Olin
Mathieson Chemical Corporation, New Haven, Conn.,
a corporation of Virginia
No Drawing. Filed Nov. 1, 1963, Ser. No. 320,932
6 Claims. (Cl. 260—927)

This invention relates to a series of heretofore unknown polyisocyanates. More particularly, it relates to phosphorus containing isocyanates having the following general formula:

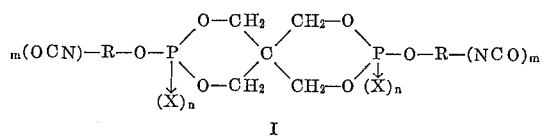

I wherein R represents an aromatic moiety preferably a benzene ring, a methyl substituted benzene ring, or a naphthalene ring; wherein X is oxygen or sulfur; wherein $n$ is an integer from 0–1; and wherein $m$ is an integer from 1–3.

One of the important intermediates utilized in the work described herein is 3,9-dichloro-2,4,8,10-tetraoxa-3,9-diphosphaspiro[5.5]undecane-3,9-dioxide which is prepared in accordance with the process described in copending application S.N. 175,270 filed on February 22, 1962 (now abandoned) wherein pentaerythritol is reacted with phosphoryl chloride. This compound is represented by the following structural formula:

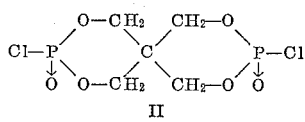

II

Another intermediate which has been used in the preparation of isocyanates having the Formula I is 3,9-dichloro - 2,4,8,10 - tetraoxa - 3,9 - diphosphaspiro[5.5] undecane, the preparation of which has been described by Lucas et al. in J. Am. Chem. Soc. 72, 5491 (1950), wherein pentaerythritol is reacted with phosphorus trichloride. This compound has the formula:

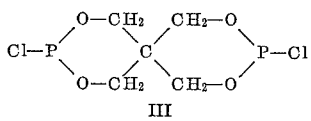

III

A variety of synthetic approaches has been taken to prepare the polyisocyanates (I) using the dichlorides (II) and (III) as beginning intermediates. For example, (II) has been reacted with a variety of the alkali metal salts of nitrophenols and nitronaphthols to provide a series of nitrated derivatives which have been converted to polyamines by appropriate hydrogenation procedures. Finally, these polyamines have been converted to the corresponding polyisocyanates by reaction with phosgene. The following sequence of reactions will serve to illustrate the preparation of a polyisocyanate (I) wherein sodium 2,4-dinitrophenoxide is a beginning reactant.

II + 2NO₂-⟨⟩-ONa ⟶

2ON-⟨⟩-O-P(...)P-O-⟨⟩-NO₂
         (spiro structure with NO₂ groups)

↓ H₂ corresponding tetramine

↓ HCl | COCl₂

OCN-⟨⟩-O-P(...)P-O-⟨⟩-NCO
         (spiro structure with NCO groups)

The alkali metal salts of o-nitrophenol, m-nitrophenol, p-nitrophenol, 2,6 - dinitrophenol, 3,4 - dinitrophenol, 3-nitro-p-cresol, 4-hydroxy-2-nitrotoluene, 2-hydroxy-4-nitrotoluene, 2-hydroxy-3,5-dinitrotoluene, 3-hydroxy-6-nitrotoluene, 2-nitro-1-naphthol and 2,4-dinitro-1-naphthol have also been reacted with (II) in a similar manner. The salts of 2,3-dinitrophenol, 2,5-dinitrophenol, 2,4,6-trinitrophenol, 2,3,6 - trinitrophenol, 2,4,5 - trinitrophenol, 2-hydroxy-3-nitrotoluene, 2-hydroxy-5-nitrotoluene, 3-hydroxy-2-nitrotoluene, 3-hydroxy-4-nitrotoluene, 3-hydroxy - 2,4,6 - trinitrotoluene, 1-nitro - 2 - naphthol, 5-nitro-2-naphthol, 8-nitro-2-naphthol, 1,6-dinitro-2-naphthol, 1,8-dinitro-2-naphthol, 6-nitro-2-naphthol and 7-nitro-2-naphthol can also be used in the reaction with the dichloride (II) to provide nitrated derivatives which can be converted to polyisocyanates in accordance with the above equation.

The reaction of the aforementioned alkali metal salts with the dichloride is conveniently performed in a solvent at a reaction temperature of about 75° C. or less, preferably at room temperature. Suitable solvents which can be used are dimethylformamide, dimethylacetamide and so forth. The formed inorganic salts can be readily removed from the reaction mixture by filtration.

Instead of utilizing the alkali metal salts of the nitrophenols and nitronaphthols as shown in the above equation, the free nitrophenols and nitronaphthols disclosed may be reacted with (II) in the presence of an acid acceptor such as a tertiary amine to obtain the necessary nitrated derivatives. For example, p-nitrophenol has been reacted with the dichloride (II) in the presence of triethylamine and in chloroform solution to provide a dinitrated derivative which was converted to the corresponding diisocyanate by hydrogenation and phosgenation.

Another sequence of reactions whereby polyisocyanates having the Formula I have been prepared involves the reacting of various aminophenols and aminonaphthols with the dichloride (III). The following equations will serve to illustrate the preparation of a polyisocyanate wherein p-aminophenol is a beginning reactant.

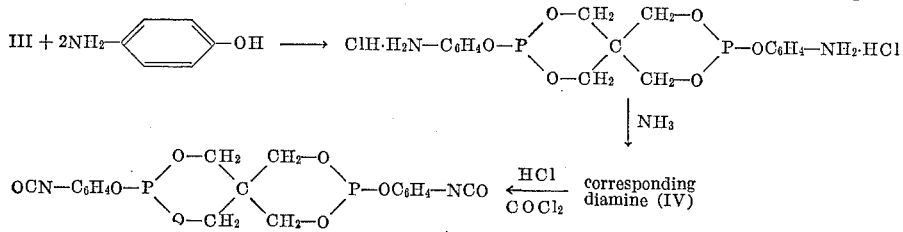

The free diamine (IV) thus obtained was reacted with melted sulfur to provide a diamine having two P→S-groupings. Reaction of the diamine with sulfur in a carbon disulfide solvent also provides the same P→S derivative. The following equation illustrates the preparation of polyisocyanates having this type of grouping.

IV + Sulfur ⟶

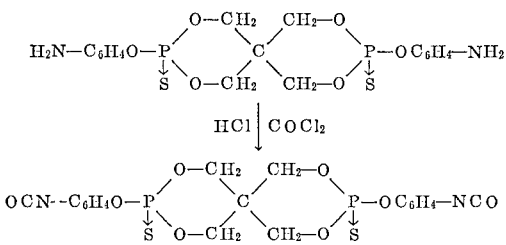

Some of the other amino-derivatives which have been reacted with the dichloride (III) in a similar fashion are o-aminophenol, m-aminophenol, 3-amino-4-nitrophenol, 3-amino-1-naphthol, 4-amino-1-naphthol, 5 - amino - 1-naphthol, and 4-amino-2-methyl-1-naphthol. Other compounds which can be reacted with (III) include 2-amino-4-nitrophenol, 3-amino-6-nitrophenol, 2-amino-1-naphthol, 3-amino-2-naphthol, 4-amino-2-naphthol, 5 - amino - 2-naphthol, 6-amino-2-naphthol, 7-amino-2-naphthol and 8-amino-2-naphthol.

The above aminophenols and aminonaphthols can be conveniently reacted with (III) in various organic solvents at reaction temperatures of about 10°–75° C. Suitable solvents which are used in this reaction are dimethylformamide or halogenated hydrocarbons such as chloroform and carbon tetrachloride.

The reduction of the nitrated intermediates to the corresponding amines is preferably carried out by known catalytic hydrogenation procedures. For instance, hydrogenation utilizing a Raney nickel catalyst may be performed. Also the noble metal catalysts may be used such as palladium on carbon powder, platinum dioxide and the like.

Finally, the amines may be converted to the desired products (I) by first adding hydrogen chloride to form the hydrochloride and then adding phosgene at a temperature between about 130°–190° C. and preferably about 165° C. The reaction is readily performed in a solvent, and a variety of solvents may be utilized. Chlorinated aromatic hydrocarbons are particularly useful solvents for this reaction.

The following examples will serve to illustrate the preparation of a polyisocyanate included in the Formula I from a starting dichloride. It is to be understood that these examples are illustrative only, and they are not to be construed as limiting the scope of this invention.

*Example 1*

Into a one liter three-necked flask equipped with stirrer, dropping funnel and condenser was placed a solution of 32.2 g. (0.2 mole) of dry, powdered sodium p-nitrophenoxide in 150 ml. of dimethylformamide. A freshly prepared solution of 29.7 g. (0.1 mole) of 3,9-dichloro-2,4,8,10-tetraoxa-3,9-diphosphaspiro[5.5]undecane-3,9 - dioxide in 150 ml. of dimethylformamide was rapidly added at about room temperature to the reaction flask with stirring. An ice water bath was used to control the slightly exothermic reaction. After addition was completed, the mixture was stirred at ambient temperature for one hour. The inorganic salt formed in the reaction mixture was removed by filtration, and 9.2 g. of sodium chloride was thus obtained as compared with the theoretical amount of 11.7 g. if complete reaction had occurred. The solvent was then removed from the reaction mixture by distillation in vacuum. A clear viscous oil remained which crystallized to a cake upon standing. Repeated trituration of this product with cold ethanol removed some adhering sticky by-product. The almost colorless residual solid was washed once with ether to provide a powdered solid material. The material was recrystallized from o-dichlorobenzene or preferably from ethylene glycol to provide small needles having a melting point of 231° C. The following analytical data revealed that 3,9-bis(4-nitrophenoxy)-2,4,8,10-tetraoxa - 3,9 - diphosphaspiro[5.5]undecane-3,9-dioxide had been obtained. Yield: 65.5%.

*Analysis.*—Calcd. for $C_{17}H_{18}N_2P_2O_{12}$: C, 40.49; H, 3.60; N, 5.56; P, 12.28. Found: C, 40.85; H, 3.22; N, 5.60; P, 12.16.

*Example 2*

The amount of 84.0 g. of the dinitro derivative prepared in Example 1 was dissolved in 1000 ml. of dimethylformamide, and 9.6 g. of 5% palladium-charcoal catalyst was added to the solution. The mixture was charged into a two liter stainless steel autoclave and subjected to complete hydrogenation under a sustained pressure of 48 p.s.i. at 18–24° C. The reaction was complete within 2½ hours. The catalyst was then removed from the mixture by filtration, and a clear light brown solution was obtained as the filtrate. The isolation of the diamino compound formed was effected by pouring this solution into a tenfold volume of water. Upon scratching the walls of the vessel containing the aqueous solution, an almost colorless solid crystallized. A total of 60.0 g. of the diamino compound having a melting point of 215.5° to 216° C. was thus obtained. The melting point of this product was not further raised by recrystallization from o-dichlorobenzene. The following analytical data revealed that 3,9-bis(4-aminophenoxy)2,4,8,10-tetraoxa-3,9-diphosphaspiro[5.5]undecane-3,9-dioxide had been obtained. Yield: 81.6%.

*Analysis.*—Calcd. for $C_{17}H_{20}N_2P_2O_8$: C, 46.16; H, 4.56; N, 6.33; P, 14.01. Found: C, 46.93; H, 4.79; N, 5.85; P, 13.91.

*Example 3*

The amount of 0.5 g. of the diamino derivative prepared in Example 2 was suspended in 15 ml. of o-dichlorobenzene. A slow stream of hydrogen chloride gas was passed into the suspension for 10 minutes. The formation of a heavy product which collected at the bottom of the reaction vessel was observed. The product was filtered, and 0.6 g. of solid was collected on a Buchner funnel. This product was a salt which was easily soluble in cold water, and the free base could be obtained by the addition of an appropriate amount of sodium hydroxide to an aqueous solution of the salt. The salt nature of the reaction product is further supported by the fact that silver ions precipitate silver chloride from an aqueous solution of the salt. The sal melted between 235–240° C. to a highly viscous melt on a preheated Fisher-Johns plate. The salt melted at about 208–224° C. with decomposition when it was heated from room temperature. The following analytical data revealed that the dihydrochloride of 3,9-bis(4-aminophenoxy)-2,4,8,10-tetraoxa - 3,9 - diphosphaspiro[5.5]undecane-3,9-dioxide had been obtained.

*Analysis.*—Calcd. for $C_{17}H_{20}N_2P_2O_8 \cdot 2HCl$: Cl. 13.76. Found: Cl, 13.80 (determined as ionic chlorine by titration).

*Example 4*

Into a two-liter three-necked flask equipped with gas inlet tube, stirrer, and condenser was placed 27.0 g. of the diamino derivative prepared in Example 2 and suspended in 1230 ml. of o-dichlorobenzene. A stream of hydrogen chloride gas was passed into the suspension for 20 minutes, and the resulting mixture was allowed to stand overnight. The temperature of the mixture was raised to and maintained at 170° C. using an oil bath, and a stream of phosgene was passed into the reaction vessel with gentle stirring. After approximately 30 minutes, separation of white crystals began to occur. Continuation of the phosgene treatment resulted gradually in solubilization of the solids. After 7 hours, hydrogen chloride evolution had ceased completely. Filtration of the hot reaction mixture through a Buchner funnel provided a clear filtrate from which small crystals began to separate. After standing overnight, the crystals were collected by suction filtration, washed with ether and dried. There was obtained 28.5 g. of colorless crystals having a melting point of 218–220° C. The product showed typical isocyanate reactions. For example, when contacted with hot water, carbon dioxide evolution was observed. The infrared spectrum showed the powerful isocyanate absorption at 4.4μ and the P→O absorption at 7.7μ. The following analytical data revealed that 3,9-bis(4-isocyanatophenoxy)-2,4,8,10-tetraoxa-3,9-diphosphaspiro[5.5]undecane - 3,9 - dioxide had been obtained. Yield: 94.5%.

Analysis.—Calcd. for $C_{19}H_{16}N_2O_{10}P_2$: C, 46.17; H, 3.26; N, 5.67; P, 12.53. Found: C, 46.09; H, 3.25; N, 5.49; P, 12.33.

The polyisocyanates (I) are useful intermediates in the preparation of polyurethane elastomers, foams and resins. They can be reacted with a number of polyols to provide a wide variety of polyurethanes, and the resulting products possess varied properties depending upon the character of the reacting polyisocyanates and polyols. For example, diisocyanates included in the Formula I can be reacted with diols to provide elastomeric products. On the other hand, the reaction of tetra- and hexa-isocyanates with polyols having a high hydroxy content provides resinous materials which are characterized by improved resistance to flame, and these resins are particularly useful for insulating electrical wiring. When appropriate blowing agents, such as for example water and trichlorofluoromethane, are utilized, the reaction of the polyisocyanates and polyols provides flexible and rigid foams characterized by improved flame retardancy.

The polyisocyanates can also be reacted with a number of aliphatic or aromatic hydroxy compounds to provide phosphorus containing carbamates which are useful agricultural chemicals particularly as contact and systemic insecticides.

Finally, the polyisocyanates (I) have been reacted with ethylenimine and its homologs to provide a new series of substituted ureas. The resulting aziridine derivatives have been found to be effective insect sterilants especially when used in combatting the housefly. Furthermore, these aziridine derivatives are useful as cross linking agents in the preparation of various resins particularly resins prepared from urea- and melamine-formaldehyde formulations.

What is claimed is:

1. Phosphorus containing polyisocyanates having the formula

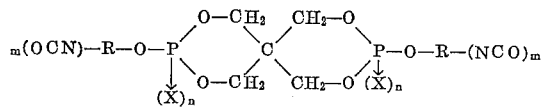

wherein R represents a benzene ring, a methyl substituted benzene ring, or a naphthalene ring; wherein X is selected from the class consisting of oxygen and sulfur; wherein $n$ is an integer from 0–1; and wherein $m$ is an integer from 1–3.

2. The compounds of claim 1 wherein R represents a benzene ring.

3. The compounds of claim 1 wherein R represents a methyl substituted benzene ring.

4. The compounds of claim 1 wherein R represents a naphthalene ring.

5. Phosphorus containing polyisocyanates having the formula

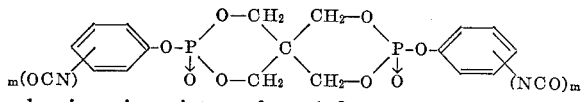

wherein $m$ is an integer from 1–3.

6. A phosphorus containing polyisocyanate having the formula

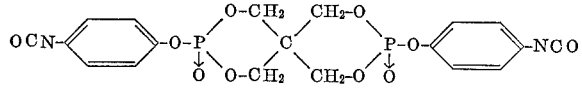

References Cited by the Examiner

UNITED STATES PATENTS

| | | | |
|---|---|---|---|
| 3,090,799 | 5/1963 | Wahl et al. | 260—927 |
| 3,090,800 | 5/1963 | Rätz | 260—927 |
| 3,187,034 | 6/1965 | Holtschmidt et al. | 260—927 X |

CHARLES B. PARKER, *Primary Examiner.*

B. BILLIAN, *Assistant Examiner.*